R. B. DISBROW.
COMBINED CHURN AND BUTTER WORKER.
APPLICATION FILED SEPT. 21, 1911.
1,018,036.
Patented Feb. 20, 1912.
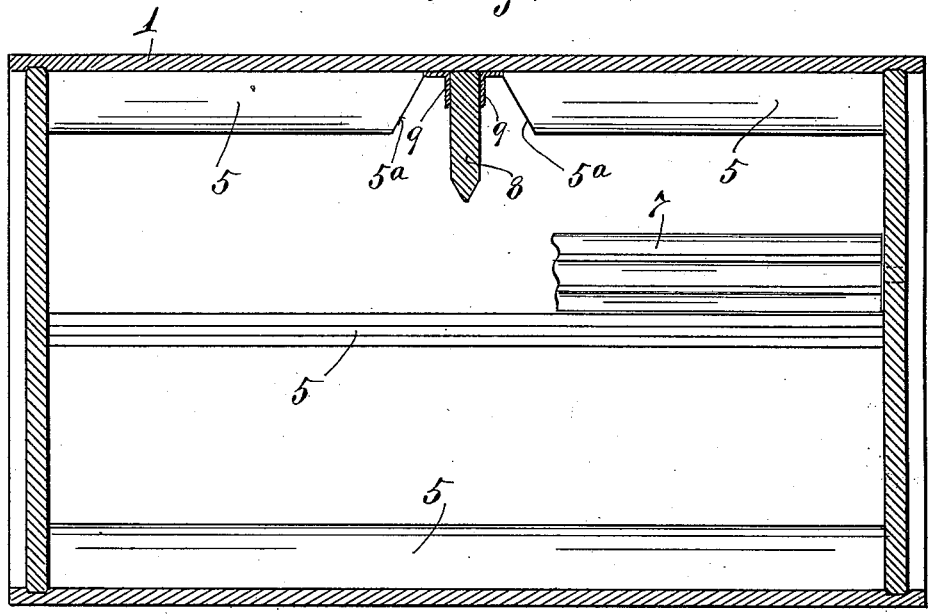
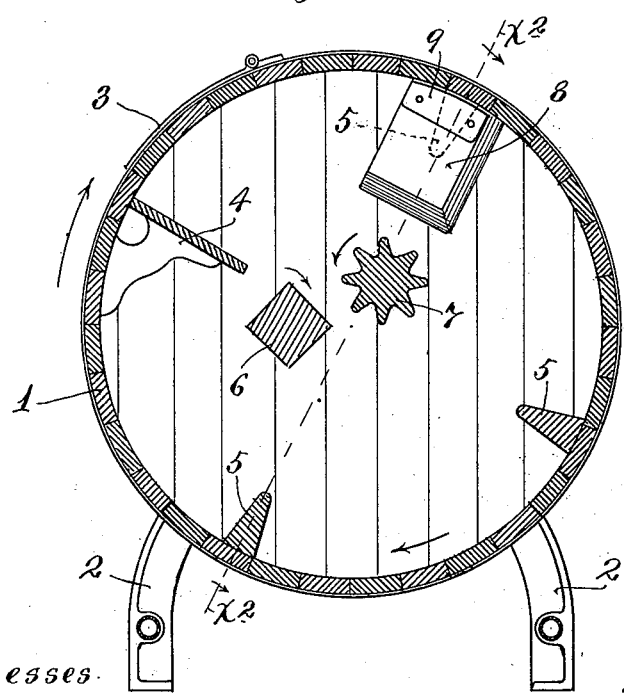
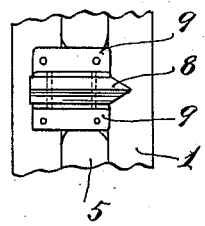
Witnesses
A. H. Opsahl.
Harvey Hillgren
Inventor.
Reuben B. Disbrow
By his Attorneys.
Williamson & Merchant

UNITED STATES PATENT OFFICE.

REUBEN B. DISBROW, OF OWATONNA, MINNESOTA.

COMBINED CHURN AND BUTTER-WORKER.

1,018,036. Specification of Letters Patent. Patented Feb. 20, 1912.

Application filed September 21, 1911. Serial No. 650,578.

*To all whom it may concern:*

Be it known that I, REUBEN B. DISBROW, a citizen of the United States, residing at Owatonna, in the county of Steele and State of Minnesota, have invented certain new and useful Improvements in Combined Churns and Butter-Workers; and I do hereby declare the following to be a full, clear, and exact description of the invention, such as will enable others skilled in the art to which it appertains to make and use the same.

My invention relates to combined churn and butter workers, and has for its object to improve the same in the several particulars hereinafter described and defined in the claims.

In the combined churn and butter workers of the type wherein coöperating butter working rollers are placed within an approximately horizontal rotary drum, and wherein the butter is lifted by a shelf or flights and delivered between the working rollers, there is a tendency on the rising side of the drum, for the mass of butter, because of its frictional contact with the heads of the drum, to fall backward at the central portion of the drum, and this has a tendency to keep the butter accumulated at or shifted toward the heads of the drum. In my present invention, I avoid this by the use of one or more so-called dividers located approximately at the longitudinal center of the drum, and preferably extended in a plane that intersects the axis of the drum at a right angle and projects inward from the shell of the drum toward one of the working rollers. This divider acts as a sort of an equalizer to prevent the butter from working toward the heads of the drum and keeps the same evenly distributed longitudinally of the drum.

In the accompanying drawings which illustrate the invention, like characters indicate like parts throughout the several views.

Referring to the drawings, Figure 1 is a transverse vertical section taken through the intermediate portion of the combined churn and butter worker, embodying my invention; Fig. 2 is a longitudinal section taken through the drum on the line $x^2$ $x^2$ of Fig. 1; and Fig. 3 is a fragmentary view showing a portion of the drum and the so-called divider blade, looking at the inner edge of the latter.

The drum 1, which is of the usual or any suitable construction, may be journaled to frame pedestals 2, in the usual or in any suitable way. Said drum is preferably provided with the customary peripheral door 3, with an internal lifting shelf 4 and with several internal flights 5.

The numerals 6 and 7 indicate the coöperating working rollers which are located within the drum, extended parallel to the axis thereof, from one drum head to the other, and are suitably journaled in the drum heads. These working rollers and the drum are adapted to be rotated in the direction of the arrows marked in Fig. 1, by the usual well known, or in any suitable driving mechanism, not necessary for the purposes of this case to consider.

The so-called divider blade or equalizer 8 is preferably, but not necessarily, made of wood and is rigidly secured to the inner surface of the drum shell by angle strips 9. The inner and forward edges of this blade 8 are preferably beveled and made quite sharp, as shown in the drawings. The beveled inner edge of the said blade 8 terminates quite close to the roller 7, and the said blade is located preferably about 90 degrees ahead of the lifting shelf 4, the term "head" here used, being in respect to the direction of the rotation of the drum.

One of the flights 5 is preferably alined longitudinally of the drum, with the intermediate portion of the divider blade 8, and this flight is cut in two at its central portion, and preferably beveled, as indicated at $5^a$ in Fig. 2.

In the butter working action and under rotation of the drum in the direction of the arrow marked on Fig. 1, the butter, after being worked between the rollers, will, on the rising side of the drum, be engaged by the divider or equalizer blade 8, and the latter will cut its way through the central portion of the body of the butter, thus dividing the same, but at the same time increasing the frictional engagement with the central portion of the body of the butter, so that it will not fall backward at the central portion of the drum faster than it does at the ends of the drum. Thus the body of the butter is raised to the rollers evenly, or approximately so, at all points longitudinally of the drum. The dividing flight 5, which is longitudinally alined with the divider blade 8, also assists in accomplishing this result.

The divider blade, in addition to the important function above noted, also assists in the working of the butter and insures better mixing of the butter and salt.

The improved device adds practically nothing to the cost of the machine and very greatly improves the action thereof. These statements are based on actual manufacture and use of a large number of machines embodying the improvement.

What I claim is:

1. In a machine of the kind described, the combination with an approximately horizontal rotary drum having internal working rollers, of a divider projecting inward from the intermediate portion of the shell of the drum.

2. In a machine of the kind described, the combination with an approximately horizontal rotary drum having coöperating working rollers and lifting shelf within the same, of a divider projecting inward from the intermediate portion of the shell of the drum toward one of the said rollers.

3. In a machine of the kind described, the combination with an approximately horizontal rotary drum having an internal lifting shelf and coöperating working rollers within said drum, of a divider projecting inward of the intermediate portion of the shell of the drum, the said lifting shelf being terminated adjacent to one of the said rollers and the said divider being terminated adjacent to the other of the said rollers.

4. In a machine of the kind described, the combination with an approximately horizontal rotary drum having an internal working roller, of a divider blade projecting inward from the intermediate portion of the shell of the drum and located in a plane that transversely intersects the axis of the drum.

5. In a machine of the kind described, the combination with an approximately horizontal rotary drum having coöperating working rollers and lifting shelf within the same, of a divider blade projecting inward from the intermediate portion of the shell of the drum toward one of said rollers, and located in a plane that intersects the axis of the drum approximately at a right angle.

6. In a machine of the kind described, the combination with an approximately horizontal rotary drum having internal lifting shelf and coöperating working rollers, of a divider blade projecting inward from the central portion of the shell of the drum, located in a plane that intersects the axis of the drum, approximately at a right angle, the said lifting shelf being terminated adjacent to one of the said rollers and the divider blade being terminated adjacent to the other of said rollers.

7. In a machine of the kind described, the combination with an approximately horizontal rotary drum having internal lifting shelf and coöperating working rollers, of a divider blade projecting inward from the central portion of the shell of the drum located in a plane that intersects the axis of the drum, approximately at a right angle, the said lifting shelf being terminated adjacent to one of the said rollers and the divider blade being terminated adjacent to the other of said rollers, and a longitudinally divided flight projecting inward from the shell of the drum and longitudinally alined with the said divider blade, substantially as described.

In testimony whereof I affix my signature in presence of two witnesses.

REUBEN B. DISBROW.

Witnesses:
BERNICE G. WHEELER,
HARRY D. KILGORE.

---

Copies of this patent may be obtained for five cents each, by addressing the "Commissioner of Patents, Washington, D. C."